United States Patent [19]

Dollison

[11] 4,312,378
[45] Jan. 26, 1982

[54] TOOL DIVERTER

[75] Inventor: William W. Dollison, Dallas, Tex.

[73] Assignee: Otis Engineering Corporation, Dallas, Tex.

[21] Appl. No.: 197,045

[22] Filed: Oct. 15, 1980

Related U.S. Application Data

[60] Division of Ser. No. 104,288, Dec. 17, 1979, Pat. No. 4,252,149, which is a continuation of Ser. No. 929,365, Jul. 31, 1973, abandoned.

[51] Int. Cl.$^3$ .................... F16K 11/02; F16K 31/122
[52] U.S. Cl. .................... 137/625.44; 137/875; 137/885; 251/31; 251/62
[58] Field of Search .................... 137/625.44, 875, 885; 251/31, 62, 63.4

[56] References Cited

U.S. PATENT DOCUMENTS

| 2,998,805 | 9/1961 | Usab | 251/62 X |
| 3,881,516 | 5/1975 | Childers et al. | 137/625.44 |

Primary Examiner—Gerald A. Michalsky
Attorney, Agent, or Firm—Vinson & Elkins

[57] ABSTRACT

A diverter device for use in direction pumpdown or through the flowline (TFL) tools through a connector joining a main flowline to at least one branch flowline. The diverter member is pivoted by operation of a removable operator to allow movement of the tool string through a selected branch of the connector. A sealing system allows removal of the operator having to depressurize the flowlines joined at the connector. The manual operator can be easily padlocked in position. The hydraulic operator provides a rugged, reliable mechanism to translate linear movement of a hydraulic piston into rotary movement of the diverter.

4 Claims, 6 Drawing Figures

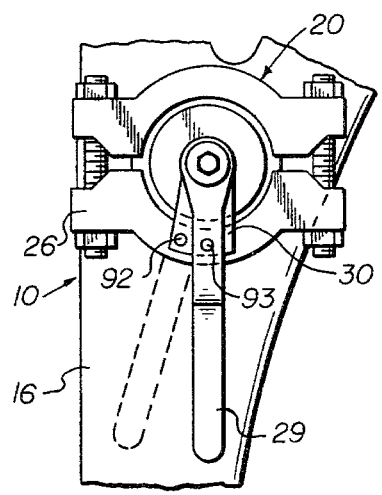
fig. 2A
fig. 3
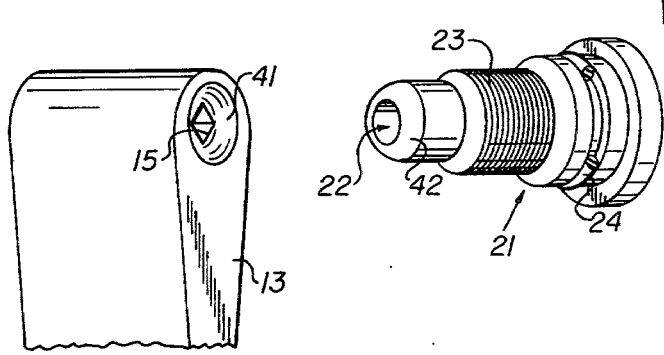
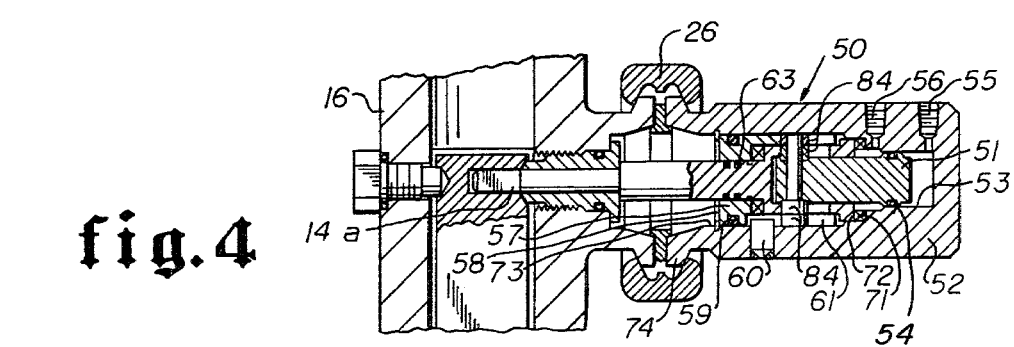
fig. 4

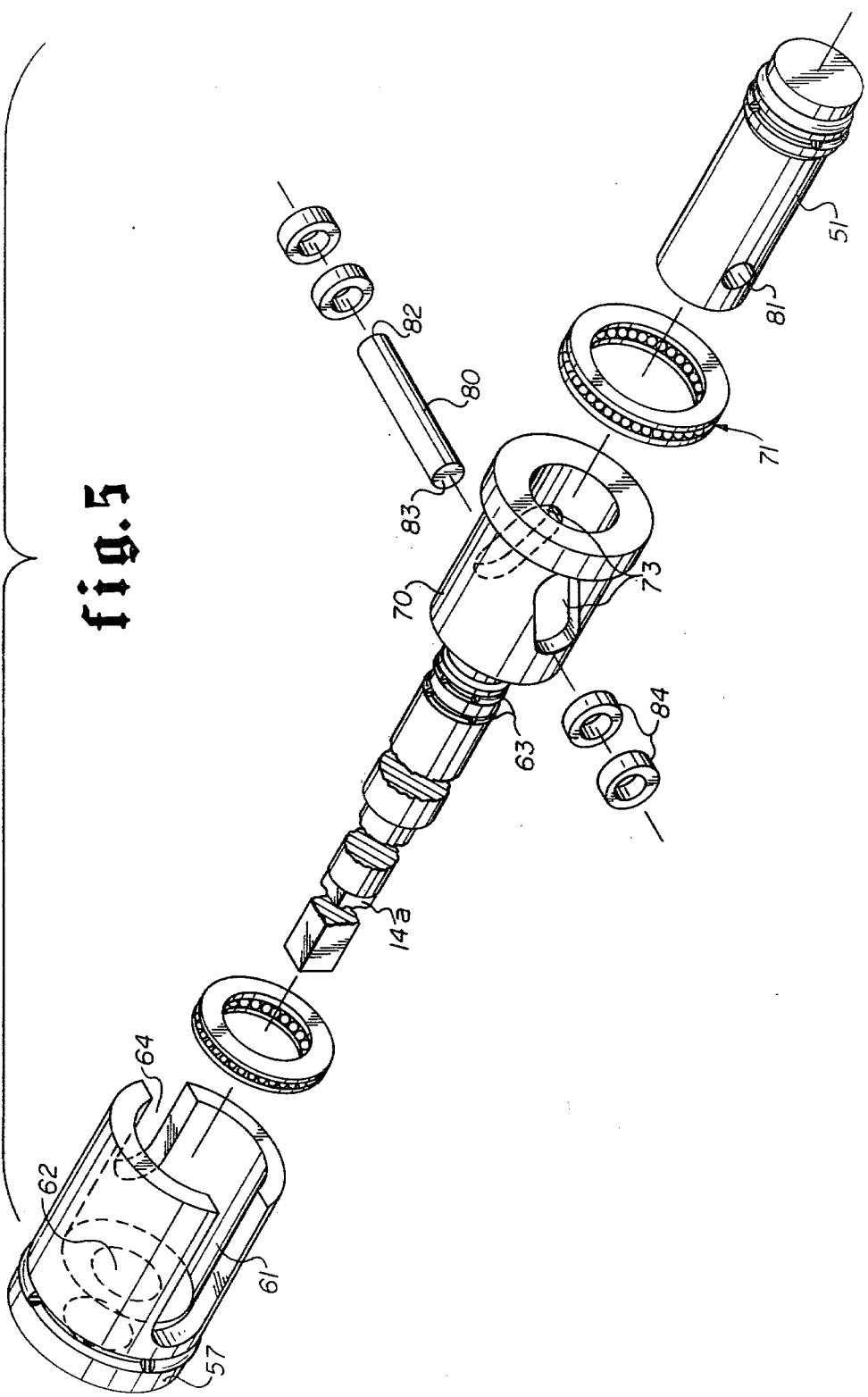

TOOL DIVERTER

This application is a division, of application Ser. No. 104,288, filed December 17, 1979, now U.S. Pat. No. 4,252,149, which is a continuation of Ser. No. 929,365 filed July 31, 1978, now abandoned.

BACKGROUND OF THE INVENTION

1. Field of the Invention

This invention relates to Y-type tool diverters for guiding TFL tools into a selected flow path. More particularly, the invention is directed to diverters having a system of seals therein permitting removal of the diverter operating shaft without depressurizing the body.

2. Description of the Prior Art

In order to economically produce oil and gas from deposits located beneath the ocean floor, a single platform is frequently used to provide production and service for many satellite wells. The satellite wells are serviced by pumpdown or TFL, meaning "through a flowline," equipment.

Examples of such TFL equipment, used by Otis Engineering Corporation, are shown on pages 4069 through 4080 of the 1074-75 Composite Catalogue of Oil Field Equipment and Services. Several wells may be served from a common flowline. Therefore, it is necessary to install a device in the common flowline to direct TFL tools, devices, and equipment to the desired well. A connector containing a diverter is frequently installed in the common flowline to direct the equipment into a branch line leading to the well to be serviced.

Mechanisms much more complex than a single Y-connector and diverter have been developed to control the movement of tool strings and/or fluid flow to underwater wells. Examples of these complex mechanisms with rotary elements having multiple drilled passageways are U.S. Pat. Nos. 3,482,601; 3,545,474; 3,545,489; and 3,595,311. Several attempts have been made to develop a satisfactory Y-connector and diverter to control the movement of a tool string to an underwater well completion to avoid the high cost of the above, more complicated mechanisms.

U.S. Pat. No. 3,472,317 shows a Y-connector and diverter. The diverter operator relies upon a resilient spring to return the diverter to its normal position.

U.S. Pat. No. 3,599,711 shows a diverter pivoted by an arm engaged by two pistons and two springs. The pistons act on opposite sides of the arm to rotate the diverter. The springs also cooperate on opposite sides of the arm to bias the diverter to its normal position.

U.S. Pat. No. 3,758,072 shows a diverter operator consisting of four pistons installed on opposite sides of an operating arm to create rotational movement.

U.S. Pat. No. 3,866,628 shows a Y-connector having a special detent mechanism to hold the diverter in a desired position.

The above patents do not disclose any mechanism to allow easy repair or replacement of the diverter operating mechanism without depressurizing the associated flowline. The above patents do not show or teach a reliable and rugged mechanism to allow remote operation of the diverter.

SUMMARY OF THE INVENTION

The present invention is directed to joining a main flowline to a branch flowline which comprises a connector body having a plurality of interior flow passages; a diverter mounted within said connector body and movable to selected positions to open and close said interior passages in a predetermined manner; an operating shaft means having one end releasably engaging said diverter and the other end extending from said connector body engaged with actuating means; a sealing gland attached to said body surrounding said operating shaft within said connector body; said actuating means carried on the exterior of said connector body for actuating said operating shaft means; and means for sealing between said diverter and said connector body to allow removal of said actuating means without having to depressurize the interior of said connector body.

Manual and hydraulic actuating means are provided for operating the diverter. The hydraulic actuating means contains means for translating linear movement of an internal piston into rotary movement of the operating shaft.

One object of this invention is to provide an improved tool diverter having an actuating means mounted on the body of the tool diverter for engaging and pivoting the diverter means, with means for sealing between said diverter means and said body to allow removal of the actuating means from the body without having to depressurize the body.

Another object of the invention is to provide a tool diverter having a sealing system which allows removal of the diverter means operating shaft without leakage of fluids from the interior of the connector body to the exterior of the connector body, and which further does not cause unnecessary wear on the sealing surfaces when the operating shaft is engaged with the diverter means.

Another object of the invention is to provide a manual operator for the diverter and means for locking the diverter in a desired position.

A further object of the invention is to provide a hydraulic operator which can replace the manual operator without having to depressurize the interior of the connector and which contains a rugged mechanism to translate linear movement of a hydraulic piston into rotary movement of the diverter operating shaft.

Still other objects, features and attendant advantages of the present invention will become apparent to those skilled in the art from a reading of the following detailed description of several embodiments constructed in accordance with the invention.

BRIEF DESCRIPTION OF THE DRAWINGS

FIG. 2A is a view in elevation showing the locking plate for the manual operator.

FIG. 3 is an exploded view of the mateable sealing surfaces on the diverter and the sealing gland.

FIG. 4 is a vertical cross-section view of a portion of a Y-connector having a hydraulic operator.

FIG. 5 is an exploded view showing the mechanism for translating linear movement of a hydraulic piston into rotary movement of the operating shaft.

BRIEF DESCRIPTION OF THE PREFERRED EMBODIMENTS

Figure 1:
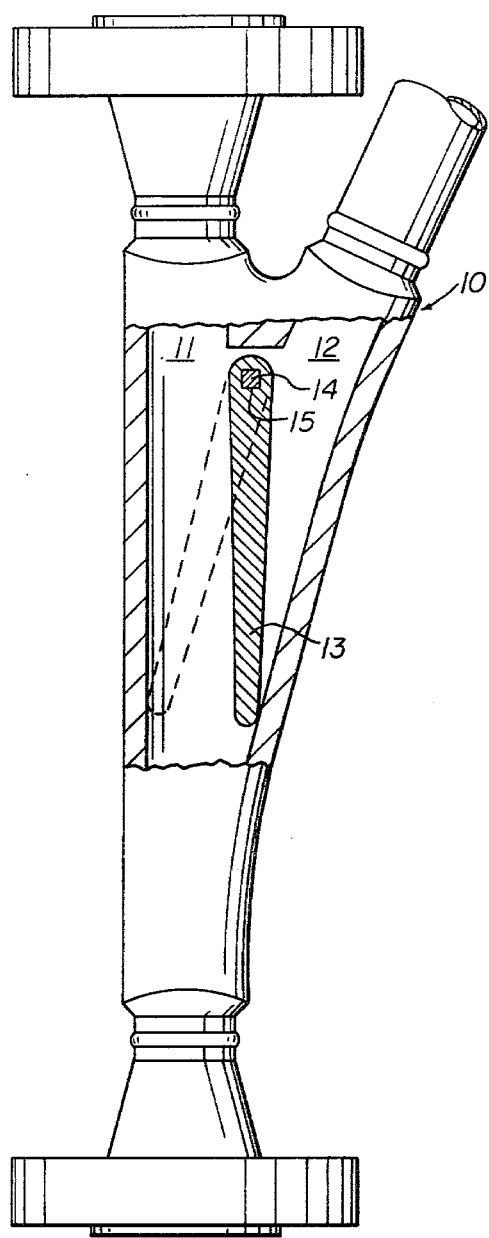
FIG. 1 is a vertical partial cross section of a Y-connector joining a main flowline and a branch flowline having a diverter at the junction of the flowlines.

Referring to FIG. 1, a Y-connector 10 is shown having a main flowline or main passageway 11 and a branch flowline or secondary passageway 12. Diverter member 13 is shown in first position to allow unobstructed movement of a tool string (not shown) through main flowline 11. When pivoted to the second position shown in dotted lines, the diverter member 13 closes the main flowline and opens the branch flowline to allow a tool string to move therethrough. Diverter member 13 is pivoted from one position to the other by rotation of an operating shaft 14. The one end of operating shaft 14 has a square cross-section engaged in a blind opening 15 in diverter 13. Operating shaft 14 is slidable axially within opening 15.

Figure 2:
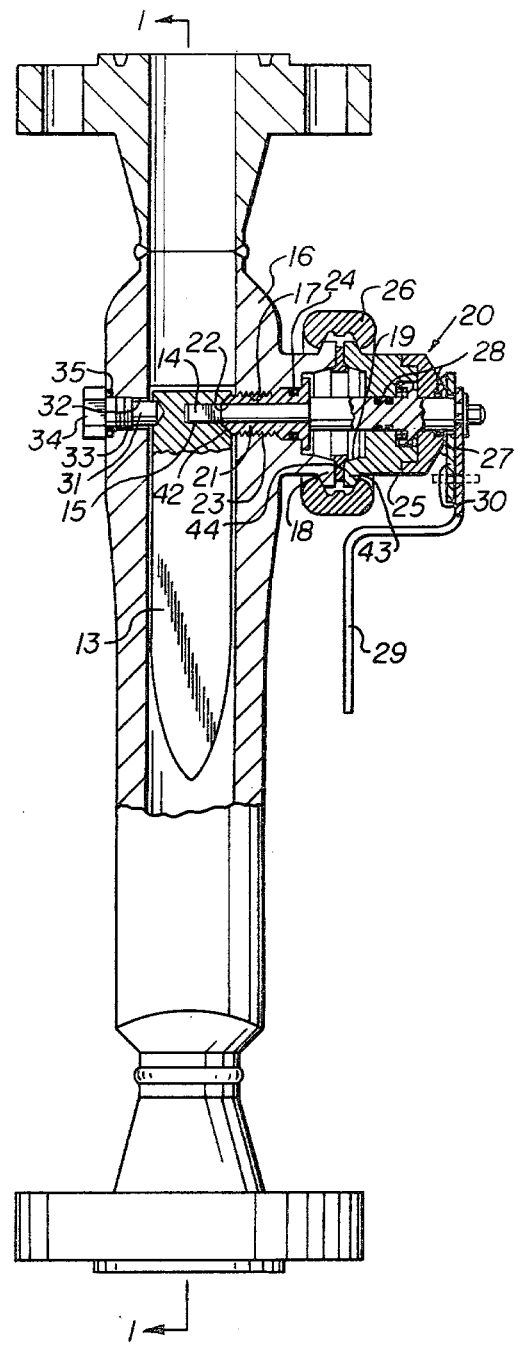
FIG. 2 is a view partially in section and partially in elevation of a Y-connector having a manual operator.

Referring to FIGS. 2 and 2A, a manual operator is shown generally at 20 for rotating operating shaft 14 to position diverter 13. The manual operator 20 is releasably mounted on the exterior of a Y-connector body 16 by a coupling 26. The connector body 16 has a threaded passageway 17 normal to the main flowline 11 and branch flowline 12 near the juncture of the two flowlines. A flange 18 is formed on the exterior of the body around passageway 17 to receive coupling 26.

A sealing gland 21 is threaded as at 23 into passageway 17. The sealing gland 21 has a bore 22 which accomodates a portion of the operating shaft 14 providing a journal surface for rotational support of the operating shaft 14. The portion of the operating shaft 14 within the sealing gland 21 has a circular cross section and is slidable axially within bore 22.

Engagement of the inner end of the gland means 21 with the diverter member, in a manner to be explained, forms a metal-to-metal seal which prevents leakage of fluids through gland bore 22. Leakage of fluids between the gland means and the body is prevented by O-ring 24 disposed as shown in a suitable external annular groove on the gland means where it sealingly engages the counter-bore formed in body 16 at the outer end of threaded aperture 17. The sealing gland 21 could also be used in a connector joining a main flowline to more than one branch flowline. The sealing gland 21 could also be used in an X-connector.

Manual operator means 20 includes a housing 25 which is generally cylindrical having a longitudinal passageway 19 therethrough which can be aligned axially with passage 17. One end of housing 25 has a hub or flange 43 which is compatible with flange 18. A seal ring 44 seals the space between these flanges. The operator housing 25 is releasably attached to the diverter body 16 by a coupling 26 joining flange 43 to flange 18 with the seal ring 44 therebetween. The housing 25 supports the outer portion of the operating shaft 14. The outer end of the operating shaft 14 extends through an opening 27 in the outer end of the housing 25. Seals 28, carried by the housing 25, prevent fluid communication from the interior of Y-connector 10 along operating shaft 14. A handle 29 can be attached to the outer end of the operating shaft 14 to allow the shifting of the diverter 13 to its first position or second position. Although a handle 29 is shown, any suitable means could be used to engage and rotate the operating shaft 14 extending from the opening 27 in the operator housing 25.

A locking plate 30 is fixed to the housing 25. The locking plate 30 has a hole (not shown) which aligns with a hole 93 in the handle 29 when the diverter 13 is in its first position and a hole 92 which aligns with hole 93 in handle 29 when diverter 13 is in its second position. Thus, a means is provided to insert a padlock (not shown) and securely lock the diverter 13 in a desired position.

As best shown in FIG. 2 and 2A, the coupling 26 can be easily uncoupled to release the operator housing 25 from the Yconnector 10 and allow removal of the operating shaft 14 from the diverter 13. Prior art Y-connectors and diverters require depressurizing the interior of the Y-connector before the operating shaft can be replaced. However, this invention includes a first sealing surface 41 on the diverter 13 surrounding the blind opening 15 therein and a second mating sealing surface 42 on the sealing gland 21. The diverter sealing surface 41 mates with the sealing gland sealing surface 42 to provide a fluid tight seal when the operating shaft 14 is removed from the diverter 13. Thus, the seal 24 and the sealing surfaces 41 and 42 prevent fluid from escaping from Y-connector 10 when the operating shaft 14 is removed from diverter 13. Preferably, the diverter sealing surface 41 is conical and sealing surface 42 is spherical to ensure a metal-to-metal solid line contact. A metal-to-metal seal is especially desired in subsea locations where an elastomer seal could not be easily replaced. Alternatively, one sealing surface could carry an O-ring in a groove.

Stem 31 is permanently positioned at assembly and is not moved thereafter. Gland 21 is adjusted at assembly to place the sealing surfaces 41 and 42 close to each other and yet permit the diverter member to pivot freely. Gland 21 is then secured by suitable means such as a "gun lock" set screw.

When either the manual operator 20 or hydraulic operator 50 is attached to the Y-connector 10 by a coupling 26, operating shaft 14 is sized such that the diverter sealing surface 41 is spaced from the sealing gland sealing surface 42. The spacing between the two sealing surfaces is important to prevent wear or damage to the surfaces during normal operation of the diverter 13.

Referring to FIGS. 4 and 5, the hydraulic operator generally designated by the numeral 50, translates linear movement of piston 51 into rotary movement of operating shaft 14a. The hydraulic operator 50 comprises a housing 52, releasably attached to the Y-connector 10 by a coupling 26. The housing 52 is generally cylindrical with a longitudinal blind bore 73 which can be axially aligned with a passageway 17 in the Y-connector body 16. A flange 74, surrounding the opening of the blind bore 73, is compatible with the flange 18 on the Y-connector body 16. The housing 52 partially defines a hydraulic chamber 53 within the blind bore 73, which contains a piston 51. A seal 54 carried by piston 51, divides hydraulic chamber 53 into two variable capacity zones. Port 55 admits hydraulic control fluid from the exterior of housing 52 into one zone and port 56 admits hydraulic fluid into the other zone. A guide cylinder 57 is slidably contained within the blind bore 73 by a snap ring 58. A seal 59 is provided concentrically about guide cylinder 57 to prevent communication of fluid between hydraulic chamber 53 and the interior of the Y-connector 10 along the exterior of guide cylinder 57.

There is a longitudinal slot 61 in the wall of the guide cylinder 57 to receive pin 60, extending inwardly of housing 52, when guide cylinder 57 is inserted into the blind bore 73. The pin 60 prevents rotation of guide cylinder 57 relative to the housing 52 but permits longitudinal movement. That portion of the operating shaft 14a having a circular cross section, is inserted through an opening 62 in the guide cylinder 57. The operating shaft 14a carries seals 63 to engage with the opening 62 to prevent communication of fluids between the interior of the Y-connector 10 and the hydraulic chamber 53. The hydraulic chamber 53 is defined by a housing 52, and seals 59 and 63. The guide cylinder 57 has a second longitudinal slot 64 directly opposite slot 61.

When using the hydraulic operator 50, the outer end of the operating shaft 14a does not exit the housing 52. Rather, the outer end of the operating shaft 14a is an integral part of the cam cylinder 70. The cam cylinder 70 is concentric with and is rotatable within the guide cylinder 57. The wall of the cam cylinder 70 has two helical slots 73 cut at an angle (preferably 45 degrees) on opposite sides of the cam cylinder 70. A piston 51 is disposed within the cam cylinder 70. To facilitate rotation of the cam cylinder 70, bearing means 71 are installed between the outer end of cam cylinder 70 and an internal shoulder 72 in the housing 52. A wrist pin 80 is inserted through the opening 81 in the piston 51 through helical slots 73 with one end 82 contained in the longitudinal slot 64 and the other end 83 contained in the opposite longitudinal slot 61.

The guide cylinder 57 is prevented by the pin 60 from rotating within the housing 52. Snap ring 58 prevents longitudinal movement of the guide cylinder 57 within the housing 52. Therefore, longitudinal movement of piston 51 by communicating hydraulic fluid to one zone of the hydraulic chamber 53 will cause movement of wrist pin 80 in slots 64 and 61. Helical slots 73 will cause the cam cylinder 70 and attached operating shaft 14 to rotate as pin 80 moves longitudinally. To assist in movement of the pin 80, bearing rollers 84 may be formed to engage slots 64, 61 and 73 respectively.

OPERATING SEQUENCE

With the manual operator 20 installed on a Y-connector 10, rotation of the operator handle 29 will shift diverter member 13 from its first position to its second position and back to position one. The diverter member 13 can be locked in either position by inserting a padlock (not shown) through a hole 93 in the handle 29 and either hole in the locking plate 30 which corresponds to the selected position for diverter member 13.

The manual operator 20 can easily be replaced with the hydraulic operator 50 without having to depressurize the tool diverter. When the coupling 26, which holds the operator housing to the Y-connector, is removed from flanges 18 and 43, operating shaft 14 will slide out of the sealing gland 21 and diverter member 13. The housing 25 can then be removed from the Y-connector 10. The fluid pressure within the interior of the Yconnector 10 causes the diverter sealing surface 41 to be forced into a fluid tight relationship with the sealing gland sealing surface 42. The seal 24, formed by sealing surfaces 41 and 42, prevents any fluid from escaping from the interior of Yconnector 10 when the operating shaft 14 is removed.

After the removal of the manual operator 20, a hydraulic operator 50 can be attached to the Y-connector body 16. A seal ring 44 is placed between the flanges 18 and 74 by following the sequence of: (a) placing seal ring over the shaft 14a, (b) inserting operating shaft 14a through the bore 22 of the sealing gland 21 and into the diverter blind opening 15, (c) seating the seal ring 44 against the face of flange 18, and then (d) coupling 26 is assembled to join the hydraulic operator housing 52 to the Y-connector body 16.

Hydraulic control fluid is conducted through hoses (not shown) which are connected to ports 55 and 56 in the housing 52. Increasing the hydraulic control fluid pressure at one port and venting pressure from the other port will cause the piston 51 to move longitudinally within the hydraulic chamber 53. The wrist pin 80 is carried by and moves longitudinally with the piston 51 within cam cylinder 70. Guide cylinder 57 is prevented from longtudinal movement within housing 52 by a snap ring 58 and internal shoulder 72. A pin 60 secured to the housing 52 prevents rotation of guide cylinder 57 with respect to the housing 52. Since one end 82 of the wrist pin 80 is contained in slot 64 of guide cylinder 57 and the other end 83 of wrist pin 80 is contained in the slot 61 of guide cylinder 57, wrist 80 and piston 51 can only move longitudinally within the operator housing 52. Wrist pin 80 also engages helical slots 73 formed on opposite sides of the cam cylinder 70. Therefore, longitudinal movement of the wrist pin 80 will cause the cam cylinder 70 to rotate with respect to the housing 52. Rotation of the cam cylinder 70 causes rotation of the operating shaft 14a which is integral therewith. Rotation of the operating shaft 14a moves the diverter 13 from its first position to its second position and back.

The previous description is illustrative only and changes or modifications may be made without departing from the scope of the invention as defined by the claims.

What is claimed is:

1. A tool diverter for joining a main flowline comprising:
   a. tool diverter body means connectable in a flow conductor system and having a flow passage therethrough diverging into two passages;
   b. diverter means mounted in said body means for pivotal movement between positions to open one while closing the other of said flow passage branches to movement of tools therethrough;
   c. actuating means mounted on said body and engaging said diverter means for pivoting said diverter means;
   d. operating shaft means having one end thereof extending into the interior of said diverter body and releasably engaging said diverter body means and the other end thereof extending from said diverter body and being integrally connected to means for causing pivotal rotation of said operating shaft;
   e. sealing means for sealing between said diverter means and said body means to allow removal of said actuating means and said operating shaft from said body means without having to depressurize the body means; and
   f. wherein said actuating means is hydraulically operable.

2. In a connector for joining a main flowline to a branch flowline, having a diverter member pivotally mounted within said connector on an operating shaft extending from said connector, and said operating shaft rotatable by an external actuator mounted on said connector, said external actuator comprising:
   a. a housing releasably mounted on said connector, said housing containing a hydraulic chamber;
   b. a piston disposed within said hydraulic chamber and sealing said chamber into two variable capacity zones;
   c. means for communicating hydraulic fluid to and from each zone;

d. a cam cylinder connected to said operating shaft and rotatably mounted within said housing;
e. a guide cylinder installed between said housing and said cam cylinder to prevent rotational movement of said guide cylinder;
f. a wrist pin joining said piston and said cam cylinder, said wrist pin extending through helical openings in opposite sides of said cam cylinder, and opposite ends of said wrist pin engaging in a longitudinal slot in opposite sides of said guide cylinder, whereby linear movement of said piston is translated into rotary movement of said operating shaft.

3. A tool diverter for joining a main flow line to a branch flow line comprising:
a. a Y-connector body having a Y-shaped bore therethrough;
b. a diverter member pivotally mounted within said Y-connector body;
c. an operating shaft having one end releasably engaging said diverter member and the other end extending from said Y-connector body;
d. a sealing gland held within said Y-connector body surrounding a portion of said operating shaft and slidably receiving the portion of said operating shaft within said Y-connector body;
e. hydraulically operated external actuating means for rotating said operating shaft, said actuating means carried on the exterior of said Y-connector body;
f. a sealing surface on said diverter member around said operating shaft; and
g. a sealing surface on said sealing gland engageable with said sealing surface on said diverter member and forming a fluid-tight seal when said operating shaft is removed from said diverter.

4. A tool diverter as claimed in claim 3, wherein said external actuating means comprises:
a. an operator housing releasably mounted on said Y-connector body and having a closed end and an open end, the open end communicating with the inside of said Y-connector body;
b. an operator shaft disposed within said operator housing and extending therefrom, through said sealing gland and engaged with said diverter member;
c. a hydraulic chamber formed within a portion of said operator housing;
d. a piston disposed within said hydraulic chamber dividing said chamber into two variable capacity pressure chambers;
e. fluid communicating means for communicating hydraulic fluid to and from said pressure chambers;
f. a cam cylinder integrally connected to the end of said operating shaft disposed within said operator housing and rotatably mounted in said housing and having an opening therein for receiving a portion of said piston;
g. a guide cylinder fixedly connected to and disposed within said operator housing in a surrounding relation to said cam cylinder; and
h. a wrist pin joining said piston and said cam cylinder, said wrist pin extending through helical openings in opposite sides of said cam cylinder, each end thereof engaging longitudinal slots in opposite sides of said guide cylinder, whereby hydraulic pressure in at least one of said pressure chambers causes linear movement of said piston and its wrist pin which is translated into rotary movement of said operating shaft.

* * * * *